(12) United States Patent
Costa et al.

(10) Patent No.: US 10,951,380 B1
(45) Date of Patent: Mar. 16, 2021

(54) OPTIMIZING UPLINK SYNCHRONIZATION VIA DYNAMIC PRACH CONFIGURATION

(71) Applicant: Sprint Spectrum L.P., Overland Park, KS (US)

(72) Inventors: Julio Costa, Tampa, FL (US); Muralidhar Malreddy, Overland Park, KS (US); Paul Tracy, St Charles, MO (US); Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 831 days.

(21) Appl. No.: 14/558,231

(22) Filed: Dec. 2, 2014

(51) Int. Cl.
| | |
|---|---|
| *H04L 5/00* | (2006.01) |
| *H04W 56/00* | (2009.01) |
| *H04W 72/04* | (2009.01) |
| *H04W 74/08* | (2009.01) |
| *H04L 5/14* | (2006.01) |
| *H04W 24/02* | (2009.01) |
| *H04W 76/18* | (2018.01) |

(52) U.S. Cl.
CPC .......... *H04L 5/0057* (2013.01); *H04L 5/0073* (2013.01); *H04L 5/14* (2013.01); *H04W 24/02* (2013.01); *H04W 56/001* (2013.01); *H04W 72/0413* (2013.01); *H04W 74/0833* (2013.01); *H04W 76/18* (2018.02)

(58) Field of Classification Search
CPC ............. H04W 74/0833; H04B 7/0632; H04B 17/309; H04B 17/24; H04L 1/0026
See application file for complete search history.

(56) References Cited

U.S. PATENT DOCUMENTS

| | | | |
|---|---|---|---|
| 5,276,911 A * | 1/1994 | Levine .................. | H04W 72/12 455/450 |
| 2011/0009139 A1* | 1/2011 | Nagata .................. | H04W 24/10 455/509 |
| 2015/0359004 A1* | 12/2015 | Xu .................... | H04W 74/0833 370/329 |

* cited by examiner

*Primary Examiner* — Elton Williams (57) ABSTRACT

Based on measurement reports reported to a base station by a plurality of UEs, the base station or a data system may dynamically configure a location of a physical random access control channel (PRACH) defined by the base station such that the PRACH is located in an optimal location. In one example, a data system may receive a plurality of subband CQI reports that includes one or more subband CQI values reported to the base station by each of a plurality of UEs served by the base station. The data system may determine, based on the plurality of subband CQI reports, that a particular range of resource blocks has a highest reported downlink air interface quality. And the data system may cause the base station define a PRACH instance in the particular range of resource blocks for carrying random access requests from the plurality of UEs to the base station.

20 Claims, 7 Drawing Sheets

OPTIMIZING UPLINK SYNCHRONIZATION VIA DYNAMIC PRACH CONFIGURATION

BACKGROUND

Unless otherwise indicated herein, the description provided in this section is not itself prior art to the claims and is not admitted to be prior art by inclusion in this section.

A typical cellular wireless communication system includes a number of base stations each radiating to define a respective coverage area in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, in a cellular wireless communication system, the air interface between a base station and served user equipment devices (UEs) may define a downlink (or "forward link") for carrying communications from the base station to the UEs and an uplink (or "reverse link") for carrying communications from the UEs to the base station. In various implementations, these links may be defined on one or more carrier frequencies or blocks of frequencies. Furthermore, on each link, various channels may be defined through techniques such as time division multiplexing, code division multiplexing, and/or frequency division multiplexing.

In one implementation, the downlink and uplink may each be divided over time into a continuum of timeslots for carrying communications between the base station and the UEs. UEs may be arranged to transmit data, such as bearer traffic (e.g., user data) and control signaling (e.g., access requests and the like), to the base station in such timeslots on the uplink, and the base station may be arranged to transmit data, such as bearer data and control signaling (e.g., paging and other overhead messages) to the UEs in such timeslots on the downlink. Further the base station or associated equipment may dynamically schedule transmissions of data in particular timeslots, and the base station and UEs may transmit according to that schedule.

When a UE is within coverage of a base station, the UE may from time to time transmit to the base station an access request message. The purpose of such an access request message may depend on the air interface protocol and the circumstances. By way of example, a UE may transmit an access request as a request to gain initial access to communication with a base station, such as to transition from an idle state to a connected state for instance or to facilitate handover to the base station. As another example, a UE may transmit an access request as a response to a page message and/or as a request to establish a particular communication connection such as a call or data session. As still another example, a UE may transmit an access request to register or reregister with a base station and/or to provide a location or tracking area update. And as still another example, a UE may transmit an access request to provide the base station with timing advance information or the like, to facilitate positioning. Once the base station receives a UE's access request, perhaps after further processing by the base station and/or associated infrastructure, the base station may then transmit an access response message to the UE.

By way of example, the initial access request that a UE transmits to the base station may take the form of a signature or pattern that is randomly selected from a plurality of signatures. For instance, in an LTE system, 64 signatures, referred to as preambles, are available, and the UE may randomly select one of the preambles to transmit to the base station. Since multiple UEs may be transmitting access requests at the same time, the preamble may serve to differentiate the request transmitted by the UE from other requests originating from different UEs. Once the base station receives the preamble, the base station may transmit an access response message corresponding to the received preamble. For instance, the response message may include an assignment of an initial uplink resource for the UE to use to communicate with the base station. In response to detecting the access response message corresponding to the preamble, the UE may then communicate with the base station on the assigned uplink resource to complete the communication connection.

In practice, when a UE transmits an access request to a base station, the UE does not have a specific resource that is allocated to the UE for use to transmit the access request. Rather, the UE transmits the access request over a shared resource that is simultaneously shared with other UEs and designated for carrying random access requests from UEs to the base station. Further, the shared resource can take any of a variety of forms depending on the air interface protocol. By way of example, in an LTE system, UEs may transmit access requests over a physical random access channel (PRACH) instance: a sequence of six contiguous physical resource blocks.

In some implementations, a base station may be configured to define at least one PRACH instance, per frame, in a particular range of resource blocks of the frame. As an example, the base station may define a single PRACH instance per frame in a particular range of resource blocks of a particular subframe. Or the base station may define multiple PRACH instances per frame in a particular range of resource blocks of multiple subframes (e.g., a first PRACH instance in a particular range of resource blocks within subframe one and a second PRACH instance in the same range of resource blocks within subframe six).

In order to inform the UEs served by the base station of the location of the PRACH instance(s), the base station may include in a system information message a designation of the location of the PRACH instance(s). In one example, the designation may take the form of two parameters that identify placement of the PRACH instance(s) in both the time domain and frequency domain respectively. For instance, the system information message may specify (i) a PRACH configuration index that indicates in which subframe(s) the PRACH instance(s) are located and (ii) a PRACH frequency offset that defines a location of the PRACH instance(s) along a carrier bandwidth (i.e., which resource block is the first of six contiguous resource blocks that define the PRACH instance(s)).

Additionally, a UE being served by a base station may, from time to time, determine its channel quality based on downlink air interface quality (e.g., downlink reference signal strength) and one or more other factors (e.g., the UE's specific antenna structure and receiver capability) and transmit to the base station a channel quality indicator (CQI) report indicating the UE's determined channel quality. The base station may then determine from the CQI report a particular modulation and coding scheme (MCS) to use for communication with the UE, and the base station may allocate air interface resources and schedule transmissions of data accordingly.

Some air interface protocols support both wideband CQI reporting and subband CQI reporting. With wideband CQI reporting, a UE may be arranged to evaluate a received downlink reference signal over the entire channel bandwidth, and to provide the base station with a wideband CQI report specifying a single CQI value that represents an effective signal-to-interference-plus-noise ratio (SINR), for example, as observed by the UE. While a wideband CQI value may reveal an overall channel quality, a wideband CQI value may also mask variations in SINR across the channel that may be present due to frequency selective fading (fading that is different across various frequencies in a frequency band) and/or inter-cell interference (interference from an adjacent base station that is communicating with other UEs).

On the other hand, with subband CQI reporting, a UE may be arranged to evaluate a received downlink reference signal in particular subbands of the channel bandwidth, and to provide the base station with a subband CQI report specifying CQI values respectively for various subbands. Such subband CQI reports may therefore be of a finer frequency granularity than wideband CQI reports.

OVERVIEW

In practice, it may be advantageous for UEs to be able to synchronize with a network quickly and efficiently during random access procedures. Unfortunately however, in some instances, due to interference conditions within an environment, UEs may experience access failures when attempting to access the network, thereby limiting the ability of the UEs to quickly and efficiently synchronize with the network.

By way of example, in an environment in which multiple base stations are deployed, communications between a first group of UEs and a first base station may adversely interfere with random access requests sent by a second group of UEs to a second base station to an extent that causes one or more UEs of the second group of UEs to experience an access failure. Such a situation may arise, for instance, if different types of base stations (e.g., macro base stations and small base stations) that share common carrier frequencies are deployed in the same environment in an uncoordinated fashion such that communications between UEs and a first type of base station interfere with access requests sent by UEs to a second type of base station. Likewise, interference from other sources in an environment may cause access failures as well, such as radio-frequency interference due to other radio communication systems in the environment, or more generally electromagnetic interference due to other electrical systems in the environment.

Disclosed herein are methods and corresponding systems to help address this problem. In accordance with this disclosure, based on the interference conditions of an environment, the location of a PRACH instance defined by a base station may be dynamically configured to be located in an optimal position. As an example, a data system may dynamically evaluate measurement reports from UEs for each of various resource blocks throughout a frame and, based on that evaluation, the data system may then select a particular range of resource blocks of the frame that would be most optimal for PRACH communication. For instance, a femtocell manager, data management system (DMS), or the like, may analyze the measurement reports to identify a particular range of resource blocks having a highest downlink air interface quality, and may then direct the base station to define a PRACH instance in that particular range of resource blocks.

In one example implementation, a base station of a cellular radio access network (RAN) may serve a plurality of UEs over an air interface. Each UE of the plurality of UEs may be arranged to determine a downlink air interface quality for one or more ranges of resource blocks respectively and transmit to the base station one or more subband CQI reports specifying CQI values for the one or more ranges of resource blocks. In some instances, the base station may cause various ones of the UEs to evaluate and provide subband CQI reports for different ranges of resource blocks, such that the base station receives subband CQI reports for a plurality of ranges of resource blocks. For example, a first UE may provide a subband CQI report for a first range of resource blocks, a second UE may provide a subband CQI report for a second range of resource blocks, and so forth.

The base station may then provide a log of the subband CQI reports to a data system (e.g., a femtocell manager, DMS, or the like) that in turn analyzes the subband CQI reports to identify a particular range of resource blocks having the highest downlink air interface quality. By way of example, the data system may identify a sequence of six contiguous resource blocks in the frequency domain (i.e., along a carrier bandwidth and within a single subframe) having a highest downlink air interface quality. Alternatively, the base station itself may analyze the log of subband CQI reports to identify the particular range of resource blocks. For example, control logic in the base station may cause the base station to identify the range of resource blocks having the highest downlink air interface quality. Note that in a time-division duplex system, the measurement reports of downlink air interface quality for a given range of resource blocks may be representative of uplink air interface quality in the same range of resource blocks. As such, the particular range of resource blocks having the highest downlink air interface quality may indicate where uplink control signaling could be optimally positioned.

Continuing with the above example, the data system may then cause the base station to define a PRACH instance in the particular range of resource blocks for carrying random access requests from the plurality of UEs to the base station. For instance, the data system may signal to the base station to provide an indication of a PRACH frequency offset and a PRACH configuration index that together define the particular range of resource blocks, and the base station may then broadcast to the plurality of UEs a system information message that specifies the PRACH frequency offset and the PRACH configuration index. Alternatively, if the base station identifies the particular range of resource blocks, the base station may configure the system information message to include a PRACH frequency offset and PRACH configuration index that correspond to the particular range of resource blocks, and the base station may then broadcast the system information message to the plurality of UEs. In this manner, the base station may define the PRACH instance in an optimal position that allows the plurality of UEs to provide access requests to the base station with minimum interference from the environment.

Accordingly, disclosed herein is a method that may be implemented in a wireless communication system in which a base station of a cellular radio access network (RAN) serves a plurality of UEs over an air interface. The method may involve receiving a plurality of subband CQI reports. The plurality of subband CQI reports may comprise one or more subband CQI values reported to the base station by each of the plurality of UEs. Further, the method may involve determining, based on the plurality of subband CQI reports, that a particular range of resource blocks of a plurality of ranges of resource blocks has a highest reported downlink air interface quality. The particular range of resource blocks may be located within a single subframe. And the method may involve causing the base station to define a PRACH instance in the particular range of resource blocks for carrying random access requests from the plurality of UEs to the base station.

In another respect, disclosed is a data system in a wireless communication system. In the wireless communication system, a base station of a cellular RAN may serve a plurality of UEs over an air interface. The data system may include a network communication interface and a controller. The data system may be configured to receive a log of subband CQI reports from the base station through the network communication interface. The log of subband CQI reports may comprise one or more subband CQI values reported to the base station by each of the plurality of UEs respectively. Further, the controller may be arranged to: (i) determine, based on the log of subband CQI reports, that a particular range of resource blocks of a plurality of ranges of resource blocks has a highest reported downlink air interface quality, the particular range of resource blocks being located within a single subframe; and (ii) cause the base station to define a PRACH instance in the particular range of resource blocks for carrying random access requests from the plurality of UEs to the base station.

Still further, in another respect, disclosed is a method that may be implemented in a wireless communication system in which a base station of a cellular RAN serves a plurality of UEs over an air interface. The method may involve the base station receiving one or more subband CQI values from each of the plurality of UEs respectively. Each of the subband CQI values may correspond to one of a plurality of ranges of resource blocks. The method may also involve the base station providing to a data system in the wireless communication system a log of a plurality of subband CQI values received from the plurality of UEs. Further, the method may involve, responsive to providing the log of the plurality of subband CQI values to the data system, the base station receiving from the data system an instruction to define a PRACH instance in a particular range of resource blocks of the plurality of ranges of resource blocks for carrying random access requests from the plurality of UEs to the base station. The particular range of resource blocks may be located within a single subframe. And the method may involve the base station broadcasting to the plurality of UEs a system information message that defines the PRACH instance as being at the particular range of resource blocks.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of a wireless communication system in which the present disclosure can be implemented. It should be understood, however, that this and other arrangements are described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 1:
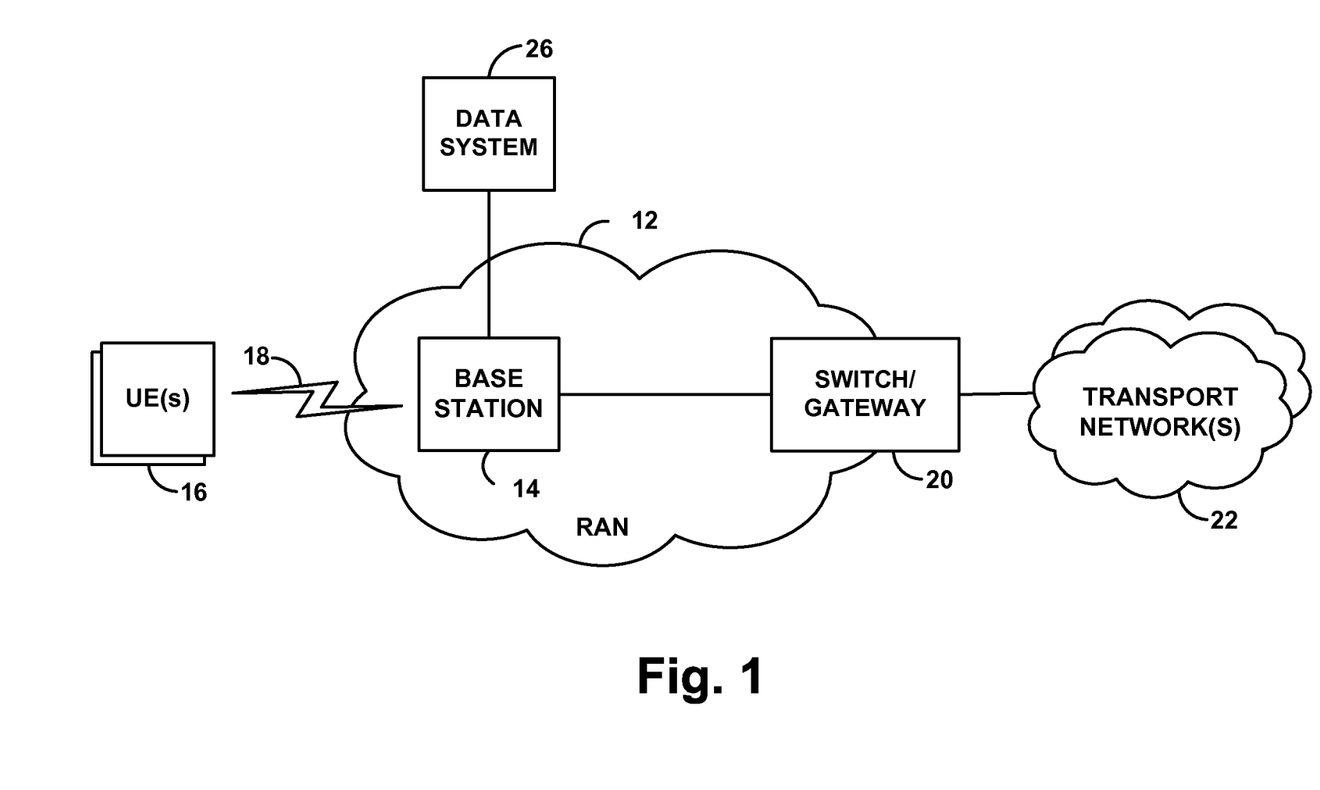
FIG. 1 is a simplified block diagram of an example wireless communication system in which the present disclosure can be implemented.

FIG. 1 depicts the example communication system as including at its core a RAN 12 having a representative base station 14, base station 14 being arranged to serve UEs 16 in a coverage area through an air interface 18. The base station may be a macro base station that is positioned at a fixed location and providing fairly wide coverage from that location. Alternatively, the base station may be a small cell base station that is currently located at a particular location and may provide more restricted coverage from that location.

RAN 12 further includes by way of example a switch or gateway 20 that provides connectivity with one or more transport networks 22, such as the PSTN or the Internet for instance. With this arrangement, each UE that is in coverage of the base station and that is suitably equipped may register or attach with the RAN and may engage in air interface communication with the base station so as to communicate in turn with various remote entities on the transport network(s) and/or with other UEs served by the RAN. Numerous variations from this arrangement are possible, however. For instance, the RAN may include more than one switch or gateway and may include various components between each switch or gateway and the transport network(s).

In this arrangement, the air interface 18 may be configured according to a particular air interface protocol, and the UEs and base station may be programmed or otherwise configured to operate according to that protocol. Specifically, the air interface may be configured according to a time-division duplex (TDD) air interface protocol. Examples of existing TDD air interface protocols include, without limitation, TDD LTE, Time-Division Code Division Multiple Access (TD-CDMA), Time Division Synchronous Code Division Multiple Access (TD-SCDMA), Wireless Interoperability for Microwave Access (WiMAX), among others. According to the air interface protocol, air interface 18 may thus define a plurality of resource blocks for carrying communications between the UEs and the base station.

Additionally, RAN 12 further includes by way of example a data system 26 that may have a wired or wireless interface with the base station 14. As discussed above, the data system 26 may be a data management system (DMS), femtocell manager, or the like, that is arranged to analyze a log of subband CQI reports and identify a particular range of resource blocks having a highest downlink air interface quality. In one example, the data system 26 may have a broadband interface with the base station 14 such as a broadband interface arranged according to the TR-069 application layer protocol for remote management of end-user devices. In another example, the base station 14 and the data system 26 may communicate via the switch or gateway 20 or via an additional switch or gateway. Alternatively, in some examples, the data system 26 may be part of the base station 14 and thus, the base station 14 may carry out the various data system functions disclosed herein. Therefore, as discussed above, variations from this arrangement are possible.

Figure 2:
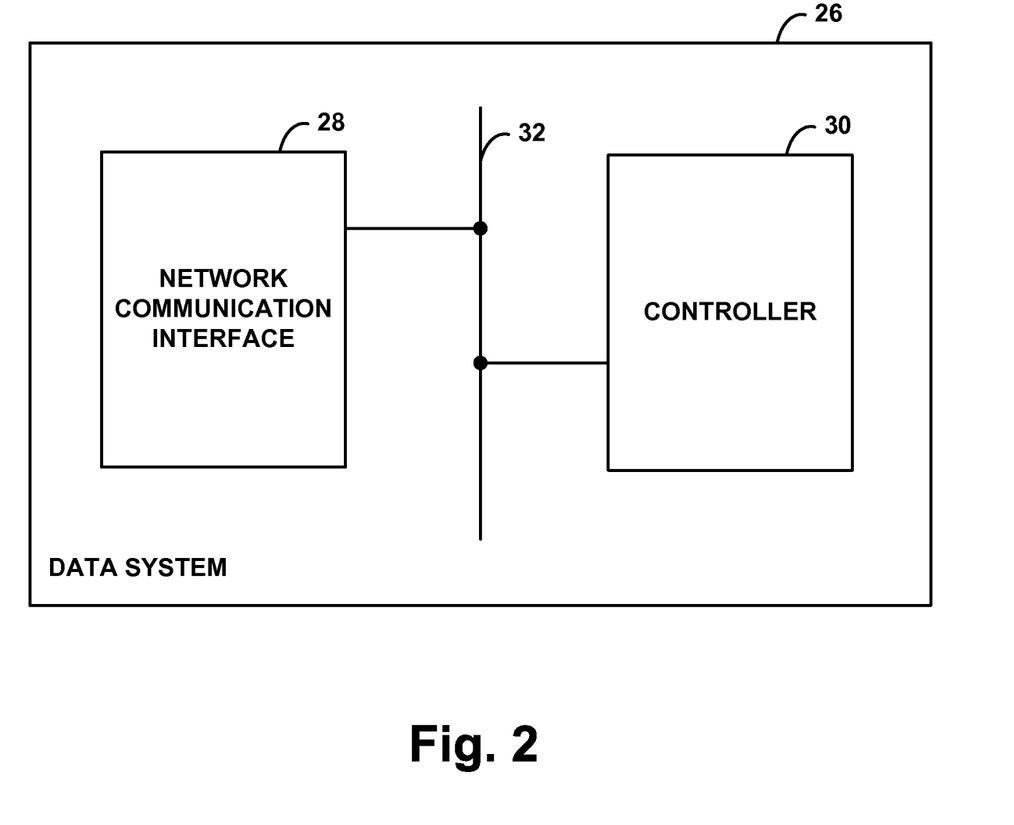
FIG. 2 is a simplified block diagram of an example data system, depicting components that can be included in such an entity to facilitate carrying out functions of the present disclosure.

FIG. 2 is next a simplified block diagram of a representative data system 26, such as a DMS, femtocell manager, or the like, illustrating some of the components that can be included in such an entity. As shown in FIG. 2, the representative data system 26 includes a network communication interface 28 and a controller 30 which may be coupled together by a system bus, network, or other connection mechanism 32.

Network communication interface 28 may comprise a wired or wireless interface for communicating with a base station, such as base station 14. In one example, the system may receive through the network communication interface 28 a log of subband CQI reports. For instance, the log of subband CQI reports may include one or more subband CQI values reported to the base station by each of a plurality of UEs, such as the UEs 16. In addition, the system may provide instructions to the base station through the network communication interface. For instance, the instructions may specify a PRACH configuration index and a PRACH frequency offset for configuring a PRACH instance in a particular range of resource blocks.

Controller 30 may then comprise one or more processing units (such as one or more general purpose processors and/or application specific integrated circuits) programmed with instructions that the processor(s) may execute so as to carry out various data system functions described herein. For instance, the controller may be arranged to determine, based on a log of subband CQI reports received via the network communication interface 28, that a particular range of resource blocks of a plurality of ranges of resource blocks has a highest reported downlink air interface quality. Further, the controller may be arranged to cause the base station to define a PRACH instance in the particular range of resource blocks for carrying random access requests from the plurality of UEs to the base station, and to perform any of the various other data system functions discussed herein.

As noted above, variations on the arrangements shown herein are possible. To help illustrate features of the present disclosure, the remainder of this document will focus on an LTE system by way of example. Those of ordinary skill in the art will readily appreciate, however, that the disclosed principles can be applied as well in other types of wireless communication systems, with variations where appropriate. By way of example, in a TD-CDMA or TD-SCDMA system, each of various base station coverage areas includes one or more time-slotted access channels on which UEs can transmit access probes defining access requests. In such a system, the location of a PRACH instance defined by the base station may be dynamically configured to be a particular access channel and/or a particular time slot based on interference conditions measured by UEs for a plurality of access channels and/or time slots.

Figure 3:
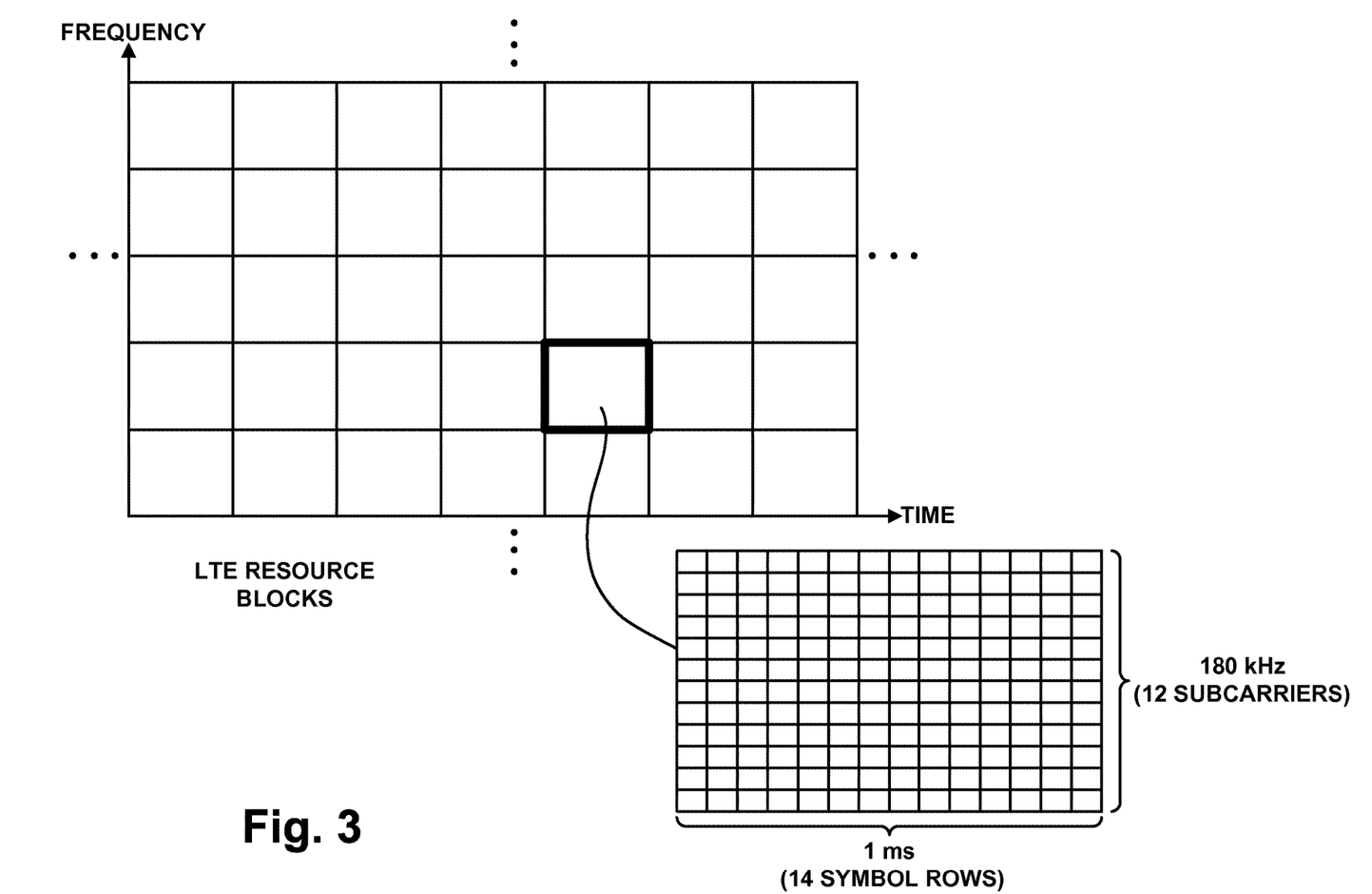
FIG. 3 is an illustration of example LTE resource blocks.

FIG. 3 is next an illustration of example LTE resource blocks. In accordance with a recent version of LTE, the air interface on both the downlink and uplink may span a particular bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of ten-millisecond frames. In accordance with TDD LTE, each ten-millisecond frame may be further divided into two five-millisecond half-frames, with each half-frame consisting of five subframes. Further, each half-frame may consist of either: 10 half-millisecond timeslots; or 8 half-millisecond timeslots and a special one-millisecond subframe that is divided into a downlink pilot timeslot, a guard point, and an uplink pilot timeslot. In practice, the length of the three fields individually within the special subframe may vary depending on the desired network configuration.

In each one-millisecond subframe, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 microseconds each, with each symbol segment spanning the 12 subcarriers of the resource block and thus each supporting transmission of 12 orthogonal frequency division multiplexing (OFDM) symbols in respective "resource elements". Thus, a base station and a served UE may transmit symbols to each other in these resource elements, particularly on subcarriers that are spaced apart from each other by 15 kHz and in time segments spanning 67 microseconds each.

The LTE air interface may then define various channels made up of certain ones of these resource blocks and resource elements. For instance, on the downlink, certain resource elements across the bandwidth may be reserved to define a physical downlink control channel (PDCCH) and other resource elements may be reserved to define a physical downlink shared channel (PDSCH) that the base station can allocate on an as-needed basis to carry transmissions to particular UEs, with still other resource elements being reserved to define a downlink reference signal. Likewise, on the uplink certain resource elements across the bandwidth may be reserved to define a physical uplink control channel (PUCCH), other elements may be reserved to define a physical uplink shared channel (PUSCH) that the base station can allocate on an as-needed basis to carry transmissions from particular UEs, and other elements may be reserved to define a PRACH to carry random access preambles from UEs to access the network.

As discussed above, a UE being served by the base station 14 may from time to time determine its channel quality based on downlink air interface quality (e.g., downlink reference signal strength) and one or more other factors (e.g., UE's capabilities) and transmit to the base station a CQI value indicating the UE's determined channel quality. For instance, the base station may broadcast the reference signal in predefined resource elements distributed throughout the bandwidth and throughout each physical resource block. The UE may then be arranged to periodically or aperiodically transmit to the base station a CQI report established based on the UE's evaluation of the reference signal. This CQI report may contain at least one 4-bit integer CQI, indicative of a suitable downlink transmission rate (e.g., MCS) that the base station can use for data communications to the UE. Generally, an integer CQI may range from a lowest-level CQI corresponding to a lowest channel quality and lowest-order MCS to a highest-level CQI corresponding to a highest channel quality and highest-order MCS. For instance, in LTE, a CQI integer may range from a lowest-level of 0 to a highest-level of 15.

Depending on configuration and operational state, the UE may be arranged to evaluate the reference signal across the entire channel bandwidth so as to establish and report a wideband CQI value generally for the entire channel bandwidth, or the UE may be arranged to evaluate the reference signal in particular subbands consisting of specific ranges of physical resource blocks, and to provide the eNodeB with a subband CQI report specifying CQI values respectively for various subbands. The UE may be arranged to transmit the wideband CQI report or subband CQI report to the eNodeB periodically or aperiodically, in an uplink control channel or along with uplink data transmission to the eNodeB.

Further, the base station may configure the UE to provide wideband CQI reports and/or subband CQI reports. For instance, the base station may send a message (e.g., a connection reconfiguration message such as a Radio Resource Control (RRC) Connection Reconfiguration Message) to the UE instructing the UE to provide wideband CQI reports and/or subband CQI reports. Further, if the base station instructs the UE to provide subband CQI reports, the message may also instruct the UE regarding which subbands to monitor. As an example, the message may specify that the UE should monitor one or more particular groups of resource blocks. Each of the particular groups of resource blocks may include a set of between two to six contiguous resource blocks within a respective subframe. Further, the message may instruct the UE to monitor the one or more particular groups of resource blocks in the subframe(s) repeatedly in every frame.

Upon detecting the message, the UE may proceed to evaluate the reference signal in accordance with the instructions, and continually provide the base station with wideband CQI reports and/or subband CQI reports. In one example, each wideband CQI report may include a single CQI value representative of a SINR observed for generally the entire channel bandwidth. Meanwhile each subband CQI report may include a vector of CQI values, and each CQI value of the vector may be representative of a SINR observed for a respective subband (e.g., a 180 kHz subband).

In some instances, the base station may cause the UE to temporarily provide subband CQI reports. As an example, the base station may provide a first message to the UE that instructs the UE to provide subband CQI reports. And then after a predetermined time period (e.g., 10 seconds, one minute, etc.) has expired, the base station may provide a subsequent message to the UE that causes the UE to revert back to just providing wideband CQI reports.

In accordance with the present disclosure, as discussed above, a plurality of UEs served by the base station may be arranged to provide subband CQI reports to the base station. In one example, each UE of the plurality of UEs may be arranged to determine a downlink air interface quality for one or more ranges of resource blocks respectively and transmit to the base station one or more subband CQI reports specifying CQI values for the one or more ranges of resource blocks. In some instances, the base station may cause various ones of the UEs to evaluate and provide subband CQI reports for different ranges of resource blocks, such that the base station receives subband CQI reports for a plurality of ranges of resource blocks. For example, a first UE may provide a subband CQI report for a first range of resource blocks, a second UE may provide a subband CQI report for a second range of resource blocks, and so forth.

In one instance, the base station may cause each UE to provide CQI reports for a random range of resource blocks that are located along a carrier bandwidth (e.g., contiguous resource blocks within a single subframe). Alternatively, the base station may cause the plurality of UEs to provide subband CQI reports for a plurality of ranges of resource blocks in a more systematic manner. By way of example, the base station may have an ordered list of possible ranges of resource blocks, and may cause various ones of the UEs to evaluate different ranges of resources blocks from the list until at least one UE has been designated to provide a subband CQI report for each possible range of resource blocks of the ordered list.

Moreover, after the base station receives a plurality of subband CQI reports, in some examples, the base station may then analyze the subband CQI reports to identify a particular range of resource blocks having the highest downlink air interface quality. By way of example, the base station may identify a sequence of six contiguous resource blocks in the frequency domain (i.e., along a carrier bandwidth and within a single subframe) having a highest downlink air interface quality. For instance, the subband CQI reports received from the plurality of UEs may include respectively for each of a plurality of ranges of resource blocks, multiple subband CQI values reported by one or more UEs of the plurality of UEs. In this scenario, the base station may identify a particular range of six contiguous resource blocks having a highest average reported subband CQI value.

Alternatively, in other examples, the base station may provide a log of subband CQI reports to the data system 26, and the data system in turn may use the log of subband CQI reports to determine the optimal position for a PRACH instance. For instance, the base station may engage in wired or wireless communication with the data system to provide the log of subband CQI reports to the data system, and the data system may then analyze the subband CQI reports to identify the particular range of resource blocks having the highest downlink air interface quality.

In one implementation, the base station may be arranged to continually store subband CQI reports in a data storage of the base station and push a log of subband CQI reports to the data system periodically (e.g., once per hour, once per day, once per week, etc.). In another implementation, the base station may receive from the data system a request to provide a log of subband CQI reports. In response to receiving the request, the base station may then provide a previously stored log of subband CQI reports to the data system. Or in response to receiving the request, the base station may collect subband CQI reports from UEs during a subsequent time period (e.g., during the next ten minutes after receiving the request), and then provide the log of subband CQI reports to the data system. In one instance, the log may include individual subband CQI reports. In another instance, the log may include information derived from individual subband CQI reports (e.g., average subband CQI values for various groups of resource blocks). Other examples are possible as well.

Figure 4:
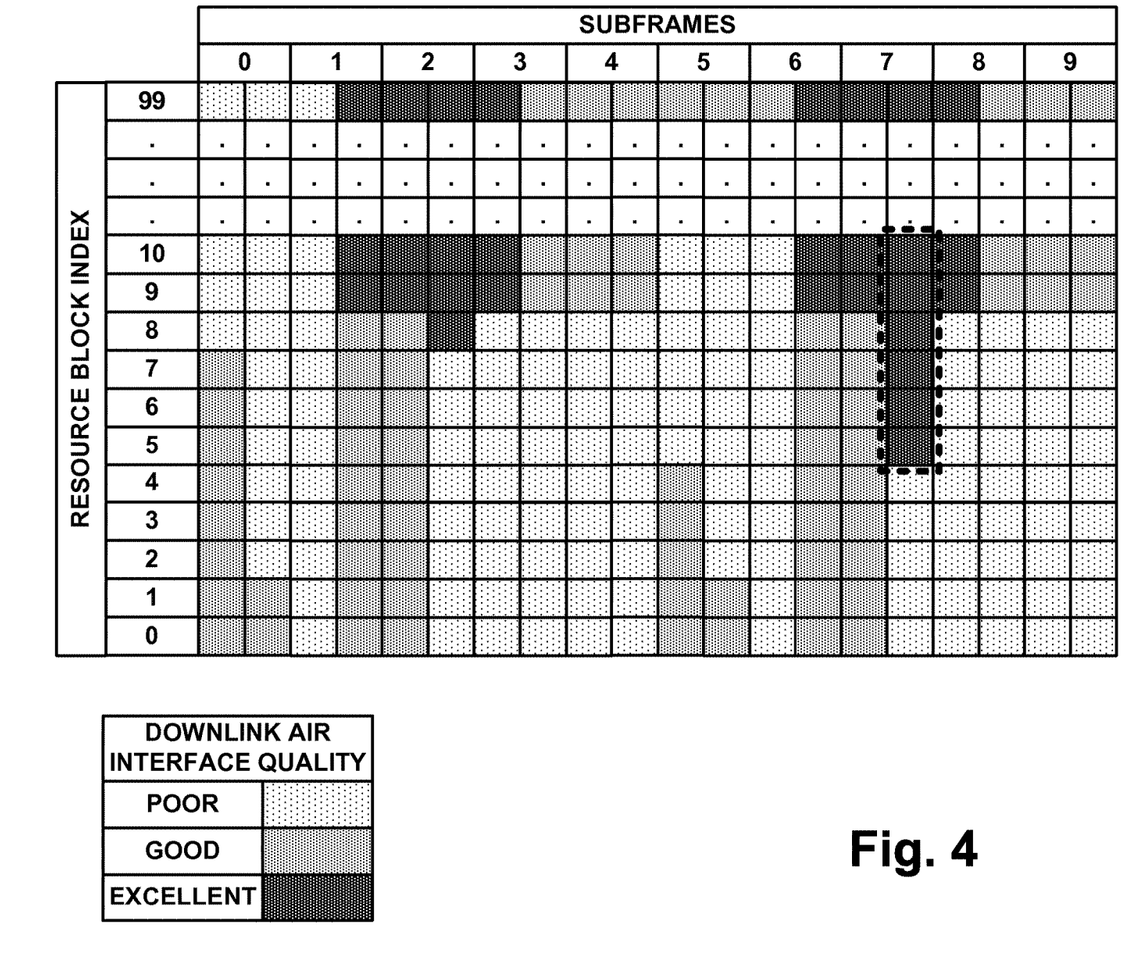
FIG. 4 is another illustration of example LTE resource blocks.

FIG. 4 is next another illustration of example LTE resource blocks. In particular, the figure depicts a representation of a 10-millisecond downlink frame. As shown, the frame includes ten 1-millisecond subframes, each divided into two half-millisecond timeslots that define resource blocks spanning a 20 MHz channel bandwidth (with only a portion of the resource blocks being shown for simplicity and ease of illustration).

In the example 10-millisecond frame of FIG. 4, each resource block includes a corresponding downlink air interface quality, ranging from poor to excellent as indicated by the shading within each resource block. In practice, the base station 14 or the data system 26 may determine a representative downlink air interface quality for each resource block based on CQI values reported for respective resource blocks, and each resource block may have a corresponding CQI value or average CQI value (not shown). However, for simplicity and ease of explanation, the resource blocks in the example illustration of FIG. 4 are designated as having a poor, good, or excellent downlink air interface quality. Note that in a scenario in which the base station does not receive a subband CQI value for one or more specific resource blocks, the base station or the data system may estimate a subband CQI value for the one or more specific resource blocks using interpolation and/or extrapolation.

In accordance with the present disclosure, a base station or data system may analyze the downlink air interface quality corresponding to each of the respective resource blocks to identify a particular range of resource blocks having the highest downlink air interface quality. By way of example, for the example illustration of FIG. 4, the base station or the data system may determine that the particular range of resource blocks outlined with a heavy-dotted line in the figure has the highest downlink air interface quality. Specifically, the particular range of resource blocks that is outlined includes resource blocks five through ten of the second timeslot of the seventh subframe.

In one example, if the data system identifies the particular range of resource blocks with the highest downlink air interface quality, the data system may then cause the base station to define a PRACH instance in the particular range of resource blocks for carrying random access requests from the plurality of UEs to the base station. For instance, the data system may provide instructions to the base station for configuring the PRACH instance. The instructions may specify a PRACH configuration index and PRACH frequency offset, for instance, that together define the particular range of resource blocks in the time domain and frequency domain respectively. As an example, for the particular range of resource blocks outlined in FIG. 4, the data system may provide to the base station instructions that indicate a PRACH configuration index of 5, since the resource block index of the lowest resource block in the particular range of resource blocks is 5, and indicate a PRACH frequency offset of 7, since the particular range of resource blocks is located in the seventh subframe.

Upon receiving the instructions from the data system, the base station may then inform the plurality of UEs of the location of the PRACH instance. For example, the base station may broadcast to the plurality of UEs a system information message that defines the PRACH instance as being at the particular range of resource blocks. In an LTE system, for instance, the system information message may be a system information block (SIB) such as SIB2. A UE in coverage of the base station may thus read that system information message to determine what PRACH instance is defined for use to transmit access requests to the base station, and the UE may then transmit an access request to the base station on the PRACH instance. Further, the base station may then monitor the PRACH instance to receive random access requests from the UE and various other UEs.

In another example, if the base station identifies the particular range of resource blocks with the highest downlink air interface quality, control logic in the base station may then cause the base station to define a PRACH instance in the particular range of resource blocks for carrying random access requests from the plurality of UEs to the base station. For instance, the control logic may cause the base station to broadcast to the plurality of UEs a system information message that defines the PRACH instance as being at the particular range of resource blocks. And the control logic may cause the base station to monitor the PRACH instance to receive random access requests from the plurality of UEs.

Further, in accordance with the present disclosure, in some examples, in response to detecting that one or more UEs served by the base station has experienced multiple access failures during a random access procedure, the base station may dynamically revaluate whether the location of a PRACH instance is in the optimal location.

By way of example, the base station may receive from a UE that is served by the base station a random access procedure attempt count. The random access procedure attempt count may be indicative of a number of access failures experienced by the UE during a recent random access procedure (e.g., the previous random access procedure attempted by the UE). For instance, the random access procedure attempt count may indicate how many times the UE transmitted a random access preamble to the base station before the UE was successfully able to receive a random access response from the base station. In practice, the UE may provide the random access procedure attempt count to the base station within a connection request message (e.g., an RRC Connection Request message) that the UE provides to the base station in response to receiving the random access response from the base station. By way of example, if the UE transmits five different random access preambles to the base station before receiving a random access response from the base station, the UE may then respond to the random access response with a connection request message that indicates a random access procedure attempt count of 5. The UE may provide the random access procedure attempt count to the base station within other types of messages as well, instead of or in addition to the connection request message.

When the base station receives the random access procedure attempt count, the base station may compare the random access procedure attempt count to a threshold (e.g., 3 attempts, 5 attempts, etc.). And in response to the base station determining that the random access procedure attempt count is greater than the threshold, the base station may cause the UE, and perhaps various other UEs served by the base station, to switch from providing wideband CQI reports to providing subband CQI reports. For instance, the base station may cause the UE to switch from only providing wideband CQI reports to providing wideband CQI reports and subband CQI reports or switch from only providing wideband CQI reports to only providing subband CQI reports. In one example, the base station may cause one or more UEs to provide subband CQI reports for a predetermined length of time (e.g., thirty seconds, one minute, etc.), and then cause the one or more UEs to revert back to providing wideband CQI reports.

In line with the discussion above, the base station may cause a UE to switch from providing wideband CQI reports to providing subband CQI reports by sending a connection reconfiguration message to the UE. The connection reconfiguration message may specify one or more particular ranges of resource blocks for the UE to monitor. For instance, the connection reconfiguration message may specify a set of two to six contiguous resource blocks within a particular subframe for the UE to monitor. And the UE may then read the connection reconfiguration message to determine which resource blocks to monitor, and provide subband CQI reports to the base station in accordance with the details of the connection reconfiguration message.

Thus, when the base station detects that a certain number of UEs (e.g., one, three, ten, etc.) have experienced multiple access failures during a random access procedure, the base station may trigger one or more UEs to provide subband CQI reports to the base station such that the base station or the data system may evaluate whether the base station is defining the PRACH instance in an optimal location within uplink frames. And if the base station or the data system identifies that another range of resource blocks has a higher downlink air interface quality than a downlink air interface quality of a range of resource blocks in which the PRACH instance is currently defined, the base station may reconfigure the PRACH instance to be located in the other range of resource blocks. In this manner, assuming measurement reports of downlink air interface quality for a given range of resource blocks are representative of uplink air interface quality in the same range of resource blocks, the UEs served by the base station may transmit access requests to the base station in a range of resource blocks having the highest uplink air interface quality. Consequently, the UEs may be able to synchronize with a network quickly and efficiently during random access procedures.

Figure 5:
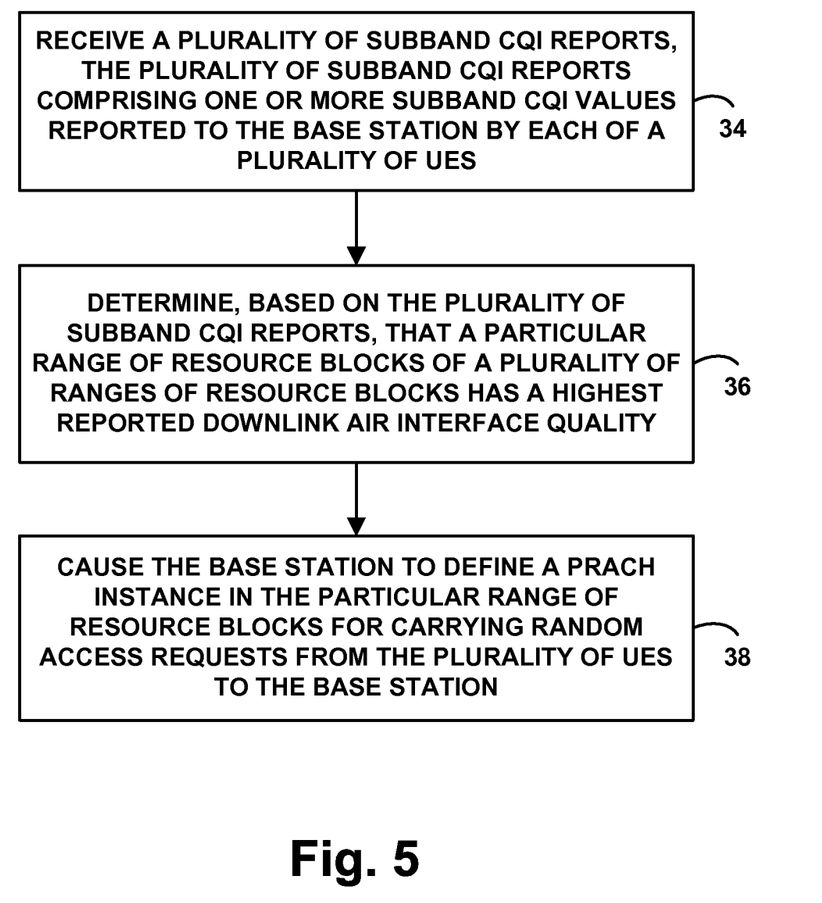
FIG. 5 is a flow chart depicting functions that can be carried out in accordance with the present disclosure.

FIG. 5 is next a flow chart depicting functions that can be carried out by a base station or data system in accordance with the present disclosure. In line with the discussion above, the base station may be a base station in a cellular RAN of a wireless communication system, and the base station may serve a plurality of UEs over an air interface. Similarly, the data system may be a data system located within a wireless communication system in which a base station serves a plurality of UEs over an air interface.

As shown in FIG. 5, at block 34, the base station or data system receives a plurality of subband CQI reports that comprise one or more subband CQI values reported to the base station by each of a plurality of UEs. At block 36, the base station or data system determines, based on the plurality of subband CQI reports, that a particular range of resource blocks of a plurality of ranges of resource blocks has highest reported downlink air interface quality. And at block 38, control logic in the base station or the data system causes the base station to define a PRACH instance in the particular range of resource blocks for carrying random access requests from the plurality of UEs to the base station.

In line with the discussion above, the plurality of subband CQI reports may include separate subband CQI values for each of the plurality of ranges of resource blocks. Further, the plurality of ranges of resource blocks may include one or more ranges of resource blocks within a plurality of subframes.

Further in line with the discussion above, the particular range of resource blocks having the highest reported downlink air interface quality may be a set of contiguous resource blocks located within a single subframe (e.g., within a single timeslot of the single subframe).

Additionally, the base station may define the PRACH instance in the particular range of resource blocks by configuring a PRACH frequency offset that defines a location of the PRACH instance along a carrier bandwidth and a PRACH configuration index that identifies the subframe where the PRACH instance is located, and broadcasting a system information message that specifies the PRACH frequency offset and the PRACH configuration index.

Figure 6:
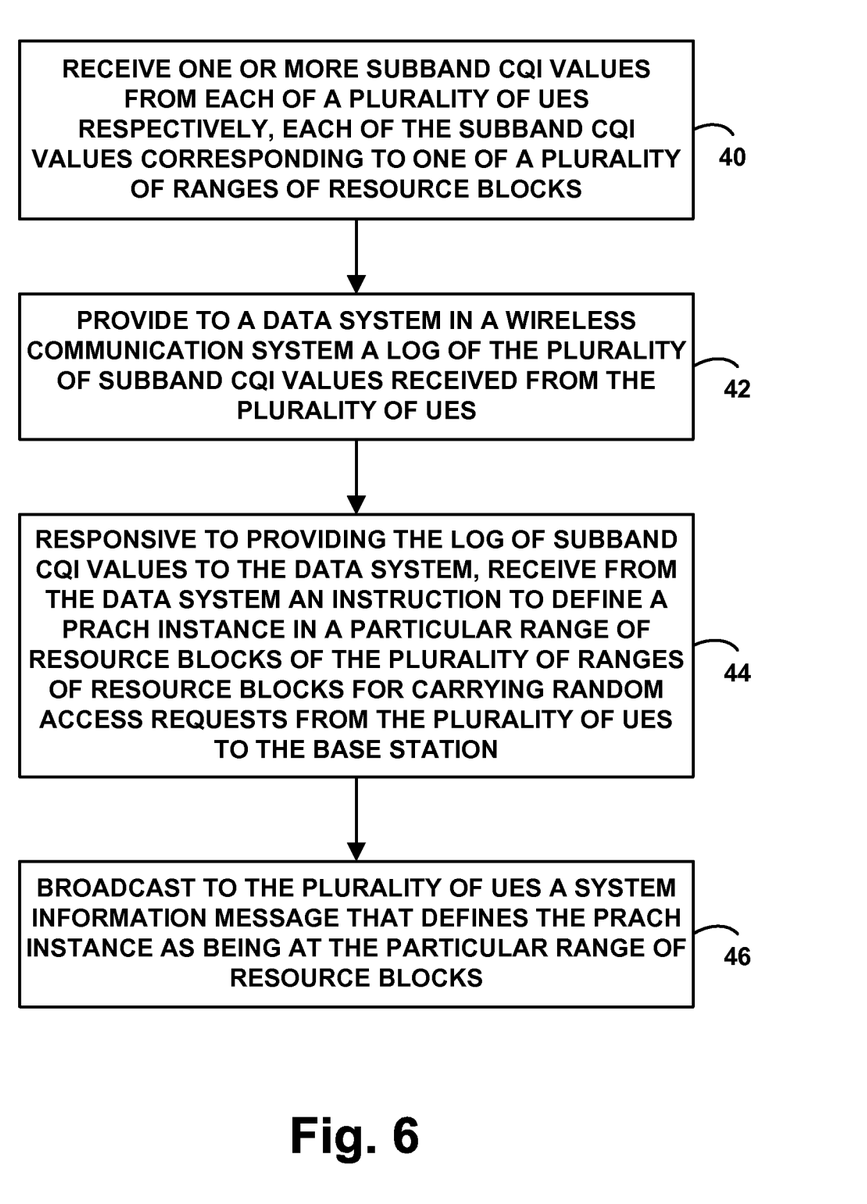
FIG. 6 is another flow chart depicting functions that can be carried out in accordance with the present disclosure.

FIG. 6 is another flow chart depicting functions that can be carried out by a base station in accordance with the present disclosure. In line with the discussion above, the base station may be a base station in a cellular RAN of a wireless communication system, and the base station may serve a plurality of UEs over an air interface.

As shown in FIG. 6, at block 40, the base station receives one or more subband CQI values from each of a plurality of UEs respectively. Each of the subband CQI values corresponds to one of a plurality of ranges of resource blocks. At block 42, the base station provides to a data system in a wireless communication system a log of the plurality of subband CQI values received from the plurality of UEs. Further, at block 44, responsive to providing the log of subband CQI values to the data system, the base station receives from the data system an instruction to define a PRACH instance in a particular range of resource blocks of the plurality of ranges of resource blocks for carrying random access requests from the plurality of UEs to the base station. And at block 46, the base station broadcasts to the plurality of UEs a system information message that defines the PRACH instance as being at the particular range of resource blocks.

In line with the discussion above, the data system may be a DMS, femtocell manager, or the like that is arranged to determine the particular range of resource blocks based on an analysis of the log of the plurality of subband CQI values. Likewise, as discussed above, in some examples, the data system may be part of the base station itself. Further, the data system may determine, based on the log of the plurality of subband CQI values, that the particular range of resource blocks has the highest reported downlink air interface quality. And as discussed above, the particular range of resource blocks may be a set of contiguous resource blocks located within a single sub frame.

Figure 7:
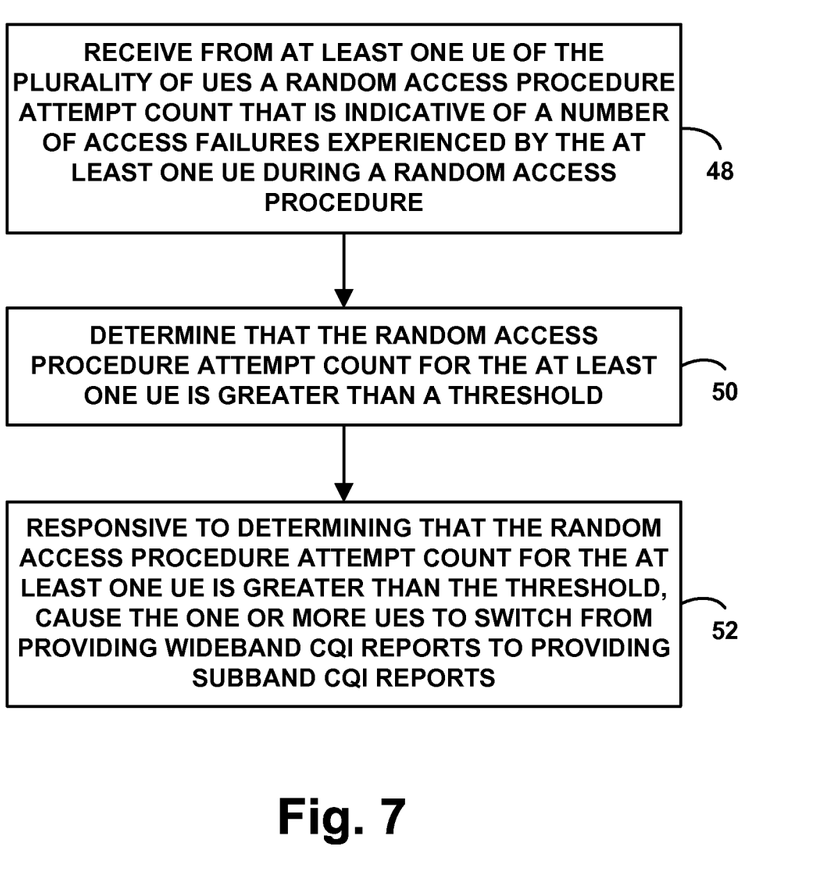
FIG. 7 is still another flow chart depicting functions that can be carried out in accordance with the present disclosure.

Finally, FIG. 7 is still another flow chart depicting functions that can be carried out by a base station in accordance with the present disclosure. In line with the discussion above, the base station may be a base station in a cellular RAN of a wireless communication system, and the base station may serve a plurality of UEs over an air interface.

As shown in FIG. 7, at block 48, the base station receives from at least one UE of the plurality of UEs a random access procedure attempt count that is indicative of a number of access failures experienced by the at least one UE during a random access procedure. At block 50, the base station determines that the random access procedure attempt count for the at least one UE is greater than a threshold. And at block 52, responsive to determining that the random access procedure attempt count for the at least one UE is greater than the threshold, the base station causes one or more UEs of the plurality of UEs to switch from providing wideband CQI reports to providing subband CQI reports.

As discussed above, the base station may receive the random access procedure attempt count for the at least one UE within a connection request message from the at least one UE. Further, the base station may cause the one or more UEs to switch from providing wideband CQI reports to providing subband CQI reports by sending a connection reconfiguration message to each of the one or more UEs that instructs the one or more UEs to provide subband CQI reports instead of or in addition to wideband CQI reports.

And additionally, the connection reconfiguration message may specify at least one range of resource blocks (e.g., a set of two to six contiguous resource blocks within a particular subframe) for each of the one or more UEs to monitor.

Exemplary embodiments have been described above. It should be understood, however, that variations from these embodiments are possible, while remaining within the scope of the invention.

We claim:

1. In a wireless communication system in which a base station of a cellular radio access network (RAN) serves a plurality of user equipment devices (UEs) over an air interface and the air interface defines a physical random access control channel (PRACH) instance for carrying UE access requests, a method for configuring a position of the PRACH instance based on air interface conditions within an environment, the method comprising:

receiving a plurality of subband channel quality indicator (CQI) reports, wherein the plurality of subband CQI reports comprises one or more subband CQI values reported to the base station by each of the plurality of UEs respectively, and wherein each of the subband CQI values corresponds to a respective range of resource blocks such that the received plurality of subband CQI reports comprises at least one CQI value for each of a plurality of ranges of resource blocks;

determining, based on an evaluation of the subband CQI values for the plurality of ranges of resource blocks, that a particular range of resource blocks of the plurality of ranges of resource blocks has a highest reported downlink air interface quality of the plurality of ranges of resource blocks, wherein the particular range of resource blocks is located within a single subframe; and based on the determination, causing the base station to configure the PRACH instance in the particular range of resource blocks having the highest reported downlink air interface quality.

2. The method of claim 1, wherein the particular range of resource blocks comprises a set of contiguous resource blocks within the single subframe.

3. The method of claim 1, wherein the plurality of ranges of resource blocks comprises one or more ranges of resource blocks within each of a plurality of subframes.

4. The method of claim 1, wherein causing the base station to configure the PRACH instance in the particular range of resource blocks comprises causing the base station to configure a PRACH frequency offset that defines a location of the PRACH instance along a carrier bandwidth, and wherein the base station broadcasts a system information message that specifies the PRACH frequency offset.

5. The method of claim 1, wherein causing the base station to configure the PRACH instance in the particular range of resource blocks comprises causing the base station to configure a PRACH configuration index that identifies the single subframe, and wherein the base station broadcasts a system information message that specifies the PRACH configuration index.

6. The method of claim 1, wherein the plurality of subband CQI reports comprises separate subband CQI values for each of the plurality of ranges of resource blocks.

7. The method of claim 6:

wherein the one or more subband CQI values reported to the base station by each of the plurality of UEs respectively comprise, respectively for each of the plurality of ranges of resource blocks, multiple subband CQI values reported by one or more UEs of the plurality of UEs, and wherein determining that the particular range of resource blocks has the highest reported downlink air interface quality of the plurality of ranges of resource blocks comprises determining that the particular range of resource blocks has a highest average reported subband CQI value.

8. The method of claim 1, wherein the air interface comprises a time-division duplex (TDD) air interface.

9. In a wireless communication system in which a base station of a cellular radio access network (RAN) serves a plurality of user equipment devices (UEs) over an air interface and the air interface defines a physical random access control channel (PRACH) instance for carrying UE access requests, a data system comprising:

a network communication interface through which the data system is configured to receive a log of subband CQI reports from the base station, wherein the log of subband CQI reports comprises one or more subband CQI values reported to the base station by each of the plurality of UEs respectively, and wherein each of the subband CQI values corresponds to a respective range of resource blocks such that the received log of subband CQI reports comprises at least one CQI value for each of a plurality of ranges of resource blocks; and a controller arranged to: (i) determine, based on an evaluation of the subband CQI values for the plurality of ranges of ranges of resource blocks, that a particular range of resource blocks of the plurality of ranges of resource blocks has a highest reported downlink air interface quality of the plurality of ranges of resource blocks, wherein the particular range of resource blocks is located within a single subframe, and (ii) based on the determination, cause the base station to configure the PRACH instance in the particular range of resource blocks having the highest reported downlink air interface quality.

10. The data system of claim 9, wherein causing the base station to configure the PRACH instance in the particular range of resource blocks comprises providing to the base station via the network communication interface instructions for configuring the PRACH instance.

11. The data system of claim 9, wherein the particular range of resource blocks comprises a set of contiguous resource blocks within the single subframe.

12. The data system of claim 9, wherein the log of subband CQI reports comprises separate subband CQI values for each of the plurality of ranges of resource blocks.

13. The data system of claim 9, wherein the air interface comprises a time-division duplex (TDD) air interface.

14. In a wireless communication system in which a base station of a cellular radio access network (RAN) serves a plurality of user equipment devices (UEs) over an air interface and the air interface defines a physical random access control channel (PRACH) instance for carrying UE access requests, a method for configuring a position of the PRACH instance based on air interface conditions within an environment, the method comprising:

the base station receiving one or more subband channel quality indicator (CQI) values from each of the plurality of UEs respectively, wherein each of the subband CQI values corresponds to a respective range of resource blocks;

the base station providing to a data system in the wireless communication system a log of a plurality subband CQI values received from the plurality of UEs, wherein the log of the plurality of subband CQI values comprises at least one CQI value for each of a plurality of ranges of resource blocks;

responsive to providing the log of the plurality of subband CQI values to the data system, the base station receiving from the data system an instruction to configure the PRACH instance in a particular range of resource blocks of the plurality of ranges of resource blocks, wherein the particular range of resource blocks is located within a single subframe; and the base station broadcasting to the plurality of UEs a system information message that defines the PRACH instance as being at the particular range of resource blocks.

15. The method of claim 14, further comprising:

the base station receiving from at least one UE of the plurality of UEs a random access procedure attempt count, wherein the random access procedure attempt count is indicative of a number of access failures experienced by the at least one UE during a random access procedure;

the base station determining that the random access procedure attempt count for the at least one UE is greater than a threshold; and responsive to the base station determining that the random access procedure attempt count for the at least one UE is greater than the threshold, the base station causing one or more UEs of the plurality of UEs to switch from providing wide-band CQI reports to providing subband CQI reports.

16. The method of claim 15, wherein the base station receives the random access procedure count for the at least one UE within a connection request message from the at least one UE.

17. The method of claim 15, wherein the base station causing the one or more UEs of the plurality of UEs to switch from providing wide-band CQI reports to providing subband CQI reports comprises the base station sending a connection reconfiguration message to each of the one or more UEs, wherein the connection reconfiguration message instructs each of the one or more UEs to provide subband CQI reports.

18. The method of claim 17, wherein the connection reconfiguration message specifies at least one of the plurality of ranges of resource blocks for each of the one or more UEs to monitor.

19. The method of claim 18, wherein the at least one range of resources blocks comprises a set of between two to six contiguous resources blocks within a particular subframe.

20. The method of claim 14, wherein the particular range of resource blocks comprises a set of contiguous resource blocks within the single subframe.

* * * * *